United States Patent Office 3,237,724
Patented Mar. 1, 1966

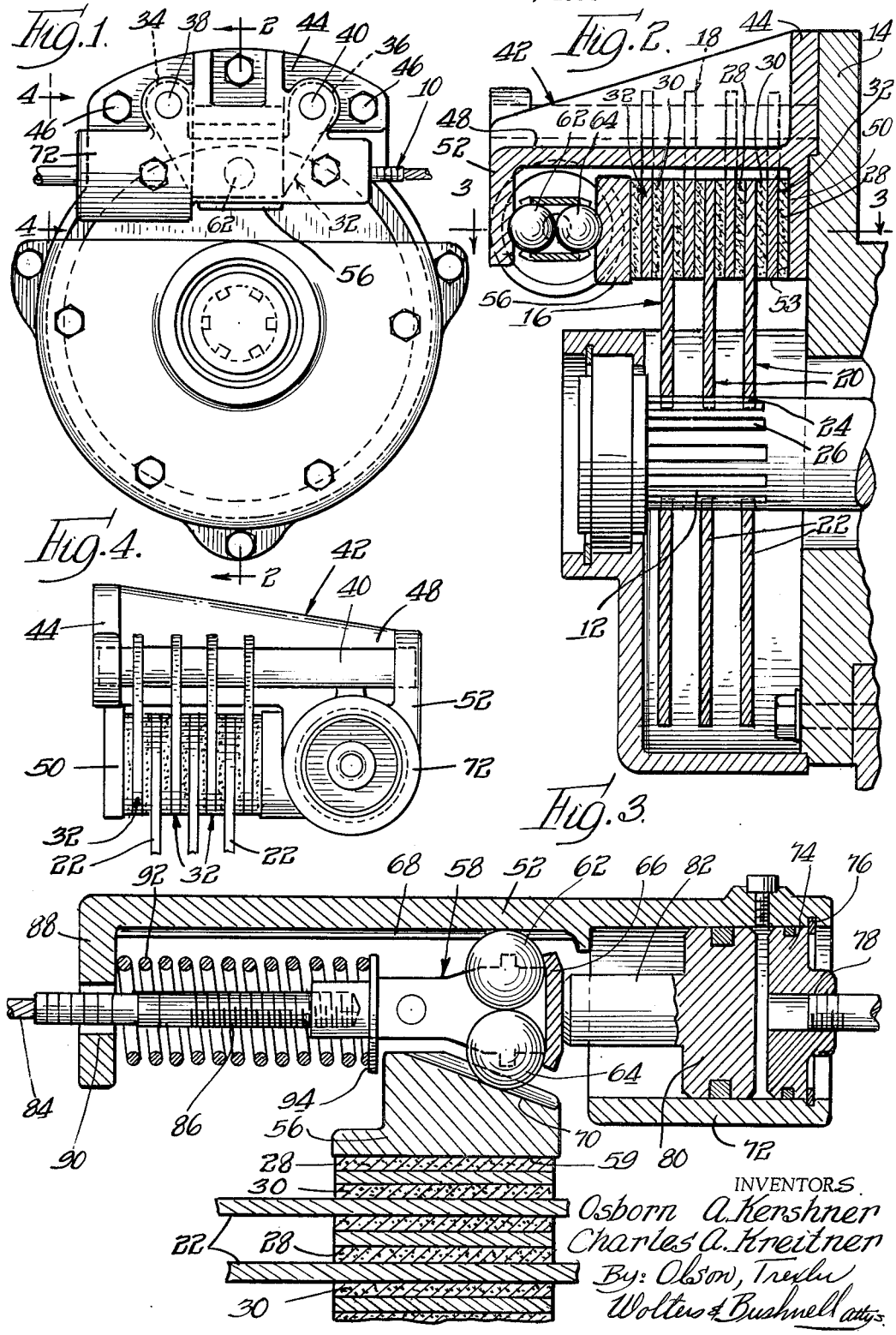

3,237,724
CAM-OPERATED, SPOT BRAKE STRUCTURE
Osborn A. Kershner, St. Joseph, and Charles A. Kreitner, Benton Harbor, Mich., assignors, by mesne assignments, to Lambert Brake Corporation, St. Joseph, Mich., a corporation of Michigan
Filed Jan. 31, 1964, Ser. No. 341,629
6 Claims. (Cl. 188—73)

The present invention relates to a novel brake structure and more specifically to a novel spot brake structure.

An important object of the present invention is to provide a novel spot type brake structure for controlling a rotatable member such as a wheel or a shaft, which brake structure is of simplified construction and is capable of providing a relatively efficient braking action.

A further important object of the present invention is to provide a novel brake structure having improved braking action and being of compact construction.

Still a further object of the present invention is to provide a novel spot type brake structure of the above-described type which may be efficiently and effectively actuated hydraulically and mechanically.

Other objects and advantages of the present invention will become apparent from the following description and the accompanying drawings wherein;

FIG. 1 is a side elevational view showing a brake structure incorporating features of the present invention;

FIG. 2 is an enlarged fragmentary sectional view taken generally along line 2—2 in FIG. 1;

FIG. 3 is a further enlarged fragmentary partial sectional view taken generally along line 3—3 in FIG. 2; and FIG. 4 is a fragmentary elevational view taken along line 4—4 in FIG. 1.

Referring now more specifically to the drawings wherein like parts are designated by the same numerals throughout the various figures, a brake structure 10 incorporating features of the present invention is adapted to be assembled with or installed in a wide variety of machines or vehicles having a rotary member or shaft 12 to be controlled. The machine or vehicle with which the brake structure 10 is assembled need not be shown or described in detail and it suffices to state that the machine or vehicle comprises a fixed frame or other member 14 adjacent the shaft 12 on which the brake unit 10 is mounted.

The brake structure 10 comprises rotor means 16 mounted on or rotatable with the shaft 12 and stator means 18 adapted to be releasably frictionally engaged with the rotor means when the brake structure is energized in the manner described below. Preferably the rotor means comprises a plurality of rotor discs 20 each of which includes an annular metal disc member 22 having splines 24 at its inner margin cooperable with complementary splines 26 on the shaft so that the disc is axially slidable relative to the shaft but connected positively for rotation with the shaft.

The stator means 18 comprises a plurality of stator plates 32 having the configuration shown in broken lines in FIG. 1 and respectively disposed at opposite sides of the rotor discs as shown in FIGS. 2–4. The stator plates project from overlapping relationship with circumferentially limited peripheral portions of the rotor discs and include apertured ears 34 and 36 through which pins 38 and 40 extend for supporting the stator plates and permitting axial movement of the plates relative to the shaft 12 when the brake structure is energized. Blocks or pads 28 and 30 of suitable friction material are secured to opposite sides of the stator plates.

The brake structure comprises a frame member 42 within which the stator supporting pins 38 and 40 are mounted. The frame member 42 has a base portion 44 which is secured to the fixed frame member 14 by screws or bolts 46. Another portion 48 of the frame member extends laterally outwardly from the base portion 44 and traverses the peripheries of the rotor discs. Opposing inner and outer flanges 50 and 52 extend from inner and outer ends of the frame member portion 48. The portion or flange 50 presents a flat surface 53 cooperable with the rotor and stator means when the brake is energized as will be described more fully below.

In order to clamp the rotor and stator means together and thereby actuate the brake structure, a shoe member 56 is disposed between the friction discs and the outer depending flange 52 and wedge means 58 is disposed between the shoe member and the flange 52. The wedge means is adapted to be actuated in the manner described below for shifting the shoe member 56 axially of the shaft 12 for clamping the rotor discs and stator plates against the depending flange 50 and thereby accomplishing a braking action. The shoe member 56 presents a surface 59 parallel to the flange 50.

The wedge means comprises a pair of abutting anti-friction or ball-bearing elements 62 and 64 which are retained by a cage member 66. Opposing bearing or cam surfaces 68 and 70 are formed on the flange portion 52 of the frame member 42 and on the shoe member 56 respectively for cooperative engagement with the bearing elements 62 and 64. The bearing surface 70 is disposed so that it is inclined with respect to a plane perpendicular to the axis of the shaft 12 or, in other words, the cam surface 70 is inclined with respect to the rotor discs and stator plates so that when the wedge means 58 is moved toward the left as viewed in FIG. 3, the shoe will be forced against the rotor and stator means. The surfaces 68 and 70 have arcuate cross sections for cooperating with the balls in maintaining the wedge means in alignment with the actuating means described below.

It is to be noted that the bearing or cam surface 68 on the flange portion 52 is straight and extends parallel to the rotor discs and to a plane perpendicular to the axis of the shaft 12. This structure greatly simplifies the frame member 42 and enables the bearing or cam surface to be formed more economically. Furthermore, since the frame member 42 is fixed and the cam surface 68 is straight, the wedge means 58 will move back and forth in a straight line and in a plane perpendicular to the axis of the shaft 12 whereby easier operation of the wedge means 58 is promoted and any tendency of the wedge means to shift laterally relative to actuating means therefor which are described more in detail below is eliminated.

In order to actuate the wedge means 58, a fluid pressure cylinder 72 is mounted on or formed integrally with the frame member 42 so that the longitudinal axis of the cylinder is parallel to the cam or bearing surface 68. An outer end of the cylinder is closed by a plug 74 retained in position by a snap ring 76 and having a passageway or port 78 therethrough adapted to be connected to a suitable source of actuating fluid under pressure, not shown. A piston 80 is axially slidably mounted within the cylinder 72 which piston includes an extension rod 82 projecting from the cylinder and engaging an end of the cage member 66 of the wedge means 58. With this structure, it is seen that when the piston 80 is actuated toward the left as viewed in FIG. 3 by hydraulic or other fluid under pressure, the rod 82 pushes the cage member 66 in a straight line parallel to the cam surface 68 so that the bearing element 64 of the wedge means rides up on the cam surface 70 for forcing the shoe toward the rotor and stator means.

The brake structure further includes means for mechanically actuating the wedge means and thereby energizing the brake, which mechanical means may be operated either simultaneously with or separately from the hydraulic or fluid pressure actuating means. More specifically a flexible tension accommodating element 84 such as a cable has one end connected by means of a fitting 86 to the cage member 66 and extends from the cage member in axial alignment with the piston 80. The cable 84 extends to any desired location for connection with mechanical linkage or any other means of known construction adapted to be operated for pulling the cable 84 toward the left as viewed in FIG. 3 and thereby energizing the brake structure. It will be appreciated that the mechanical linkage may include a hand lever or a foot pedal or other suitable means and that it can be operated to supplement the energizing force provided by the hydraulic cylinder. Furthermore, the mechanical actuating means can be operated independently of the hydraulic means to serve as an emergency brake or as a parking brake or any other desired purpose.

The frame member 42 includes a flange portion 88 projecting laterally from the portion 52 and having a guide aperture 90 therethrough. The cable 84 extends through the aperture 90 which is in axial alignment with the wedge means 58 and the piston 80. In order to return the wedge means 58 toward the right as viewed in FIG. 3 to a retracted position for deenergizing the brake structure, resilient means is provided between the cage member 66 and the flange 88. In the embodiment shown the resilient means comprises a compression spring 92 having one end abutting the flange 88 and an opposite end abutting a flange 94 fixed on the cage member 66.

While a preferred embodiment of the present invention has been shown and described herein, it is obvious that many structural details may be changed without departing from the spirit and scope of the appended claims.

The invention is claimed as follows:

1. A brake for controlling a rotatable member comprising friction disc means axially shiftably mountable on and rotatable with the rotatable member to be controlled, a fixed one piece frame member of limited circumferential extent and having a generally C-shaped cross section including opposed first and second flange portions overlapping limited circumferential sections of opposite sides of said disc means, said first flange portion having means presenting a flat friction surface of limited circumferential extent parallel to said disc means, shoe means shiftably disposed between said second flange portion and said disc means, wedging means disposed between said shoe means and said second flange portion for shifting the shoe means toward said disc means and clamping the disc means between the shoe means and said surface when the brake is energized, said wedge means comprising a pair of abutting anti-friction bearing elements and a cage member retaining said bearing elements, said second flange portion including a straight bearing groove surface parallel to said disc means and said friction surface and engageable with one of said bearing elements, said shoe means including a second bearing surface inclined with respect to said first mentioned bearing groove surface and engaging the other of said bearing elements, and means connected with said cage member for exerting an actuating and shifting force on said cage member and bearing elements in a direction extending parallel to said first mentioned bearing groove surface.

2. A brake, as defined in claim 1, wherein said means for exerting an actuating force comprises a fluid pressure cylinder on said frame member in axial alignment with said wedge means and having a central axis substantially parallel to said first bearing surface, and a piston shiftably disposed in said cylinder and abutting said cage member of said wedge means.

3. A brake, as defined in claim 2, wherein said means for exerting an actuating force on said cage member further includes an elongated mechanical tension accommodating element connected with said cage member oppositely from said piston and extending therefrom in axial alignment with said piston, said tension accommodating element being operable simultaneously with and independently from said piston.

4. A brake, as defined in claim 3, which includes abutment means projecting laterally from said second portion and having an aperture therein through which said tension accommodating element extends, and spring means surrounding said tension accommodating element and disposed between said abutment means and said cage member for biasing the cage member toward a retracted position for deenergizing the brake.

5. A brake, as defined in claim 1, wherein said disc means comprises a plurality of axially spaced disc members, said brake including a plurality of stator plate members disposed between and on opposite sides of said disc members, and means on said frame member mounting said stator plate members for axial movement relative to said rotatable member to be controlled.

6. A brake, as defined in claim 1, wherein said bearing elements are ball elements, and said bearing surfaces have rounded transverse cross sections for accommodating said ball bearing elements.

References Cited by the Examiner

UNITED STATES PATENTS

| | | | |
|---|---|---|---|
| 2,076,532 | 4/1937 | Francoeur et al. | 188—106 X |
| 2,820,530 | 1/1958 | Chouings et al. | 188—73 |
| 2,983,338 | 5/1961 | Vansteenkiste | 188—73 |
| 3,132,724 | 5/1964 | Ansteth | 188—73 |

FOREIGN PATENTS

| | | |
|---|---|---|
| 47,286 | 12/1936 | France. |
| 55,621 | 5/1952 | France. |
| 1,237,699 | 6/1960 | France. |
| 844,529 | 8/1960 | Great Britain. |

FERGUS S. MIDDLETON, *Primary Examiner.*

EUGENE G. BOTZ, ARTHUR L. LA POINT,
*Examiners.*